（12） United States Patent
Iwamura et al.

(10) Patent No.: US 8,457,637 B2
(45) Date of Patent: Jun. 4, 2013

(54) MOBILE COMMUNICATION METHOD, MOBILE STATION, AND RADIO BASE STATION

(75) Inventors: Mikio Iwamura, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/380,954

(22) PCT Filed: Jun. 25, 2010

(86) PCT No.: PCT/JP2010/060886
§ 371 (c)(1),
(2), (4) Date: Mar. 7, 2012

(87) PCT Pub. No.: WO2010/150884
PCT Pub. Date: Dec. 29, 2010

(65) Prior Publication Data
US 2012/0165020 A1    Jun. 28, 2012

(30) Foreign Application Priority Data
Jun. 26, 2009  (JP) ................................. 2009-153046

(51) Int. Cl.
*H04W 36/00* (2009.01)
(52) U.S. Cl.
USPC ............ 455/436; 455/437; 455/438; 455/444
(58) Field of Classification Search
USPC .......... 455/436, 437, 438, 443, 444; 370/328, 370/331
See application file for complete search history.

(56) References Cited

U.S. PATENT DOCUMENTS

| 2009/0047960 | A1* | 2/2009 | Gunnarsson et al. ......... 455/436 |
| 2009/0129341 | A1* | 5/2009 | Balasubramanian et al. 370/331 |
| 2009/0215460 | A1  | 8/2009 | Hasegawa |
| 2009/0239533 | A1* | 9/2009 | Somasundaram et al. .... 455/434 |
| 2011/0171962 | A1  | 7/2011 | Iwamura et al. |

FOREIGN PATENT DOCUMENTS

| JP | 2009-504047 A | 1/2009 |
| JP | 2009-049661 A | 3/2009 |
| WO | 2007/015066 A2 | 2/2007 |
| WO | 2008/056411 A1 | 5/2008 |
| WO | 2008/120285 A1 | 10/2008 |

OTHER PUBLICATIONS

Abstract of WO2008/120285(A1), printed from the Espacenet database, 1 page.

(Continued)

*Primary Examiner* — Kathy Wang-Hurst
(74) *Attorney, Agent, or Firm* — Osha • Liang LLP

(57) ABSTRACT

A mobile station UE according to the present invention comprising a gist thereof is to include, a measurement configuration acquisition unit 12 configured to acquire a measurement configuration for a second cell #2 frequency f2 from the radio base station eNB#A managing a first cell #1 by transmitting a measurement configuration request to the radio base station eNB#A managing the first cell, when it is determined that it is determined to desire to measure the second cell #2 using a frequency f2 different from a frequency f1 of the first cell #1 in communication and there is not held the measurement configuration for a second cell #2 frequency f2; and a measurement report transmission unit configured to transmit a measurement report including a reception quality in the second cell #2, to the radio base station eNB#A managing the first cell #1, in response to the received measurement configuration for a second cell #2 frequency f2.

3 Claims, 5 Drawing Sheets

OTHER PUBLICATIONS

Panasonic, "Handling of Measurement Configuration," 3GPP TSG RAN WG2 #63-bis, R2-085103, Sep. 29-Oct. 3, Prague, CZ, 5 pages.
NTT Docomo, Inc., "HeNB inbound handover for Rel-9 UE," 3GPP TSG-RAN WG2 #66bis, R2-093969, Jun. 29-Jul. 3, 2009, 4 pages.
3GPP TS 36.331 V8.6.0, Jun. 2009, "3rd Generation Partnership Project; Technical Specification Group Radio Access Network; Evolved Universal Terrestrial Radio Access (E-UTRA) Radio Resource Control (RRC); Protocol specification (Release 8)," 207 pages.
3GPP TS 36.304 V8.6.0, Jun. 2009, "3rd Generation Partnership Project; Technical Specification Group Radio Access Network; Evolved Universal Terrestrial Radio Access (E-UTRA); User Equipment (UE) procedures in idle mode (Release 8)," 30 pages.
Office Action mailed on Aug. 24, 2010, in corresponding Japanese Application No. 2009-153046, with translation, 6 pages.
Vodafone, "Minimising Service Interruption Time to Acquire Relevant System Information for Inbound Handover to CSG cells in LTE," 3GPP TSG RAN WG2 #66, R2-092896, May 4-8, 2009, 6 pages.
International Search Report issued in PCT/JP2010/060886, mailed on Aug. 24, 2010, with translation, 4 pages.
Written Opinion issued in PCT/JP2010/060886, mailed on Aug. 24, 2010, 4 pages.
Japanese Office Action with translation mailed on Aug. 24, 2010, issued for Japanese Patent Application No. 2009-153046 (8 pages) (the 4 cited references in the JP Office Action were cited previously in an IDS on Dec. 27, 2011.)
Office Action for Korean Patent Application No. 2012-7002061 mailed Apr. 26, 2012, with English translation thereof (5 pages).
Patent Abstract for Japanese Publication No. 2009-049661 published Mar. 5, 2009 (1 page).
Office Action for European Application No. 10792202.3 dated Sep. 14, 2012 (8 pages).
Chinese Office Action with translation mailed on Jan. 7, 2013, issued for Chinese Patent Application No. 201080028656.4 (19 pages).

* cited by examiner

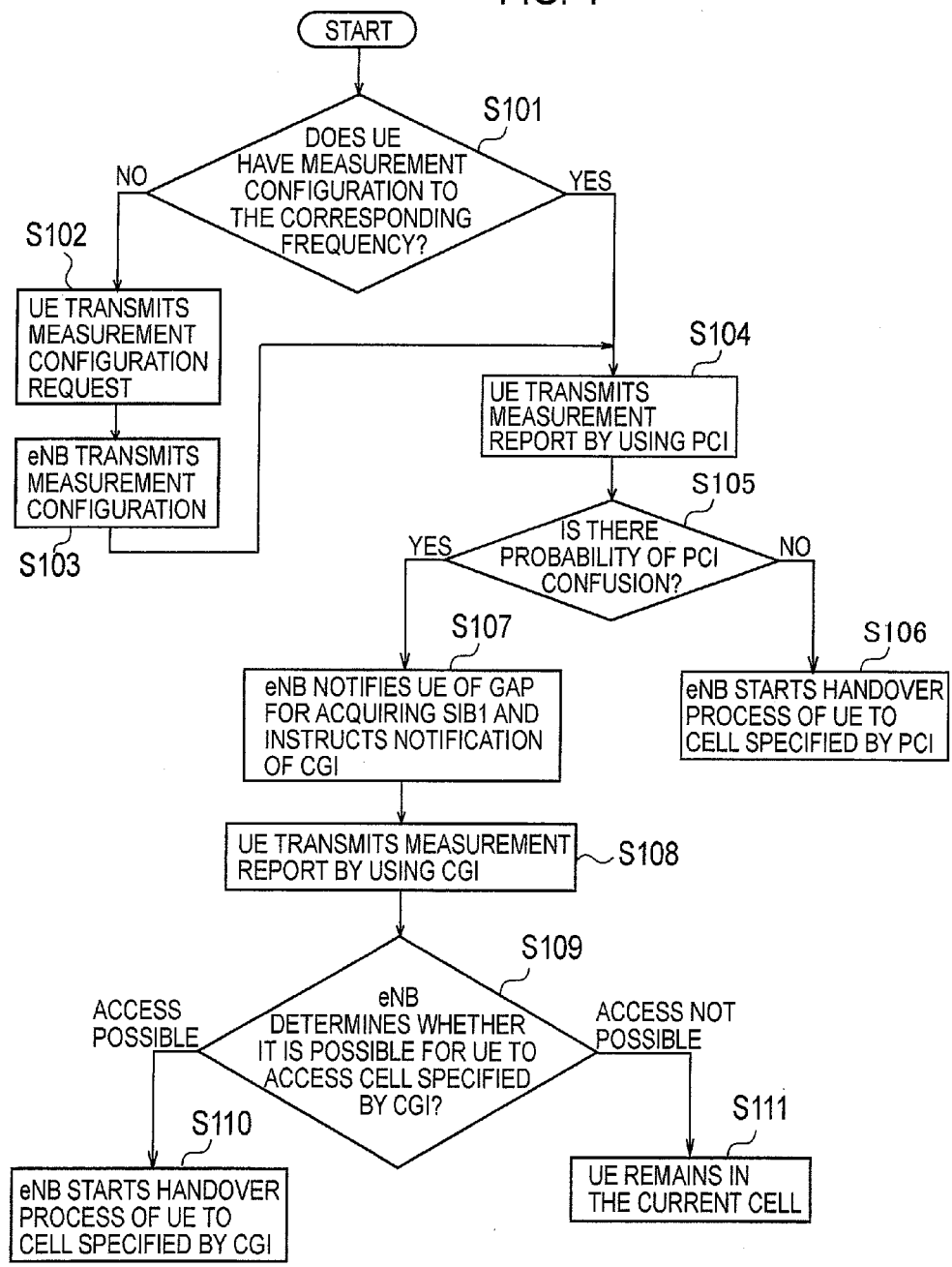

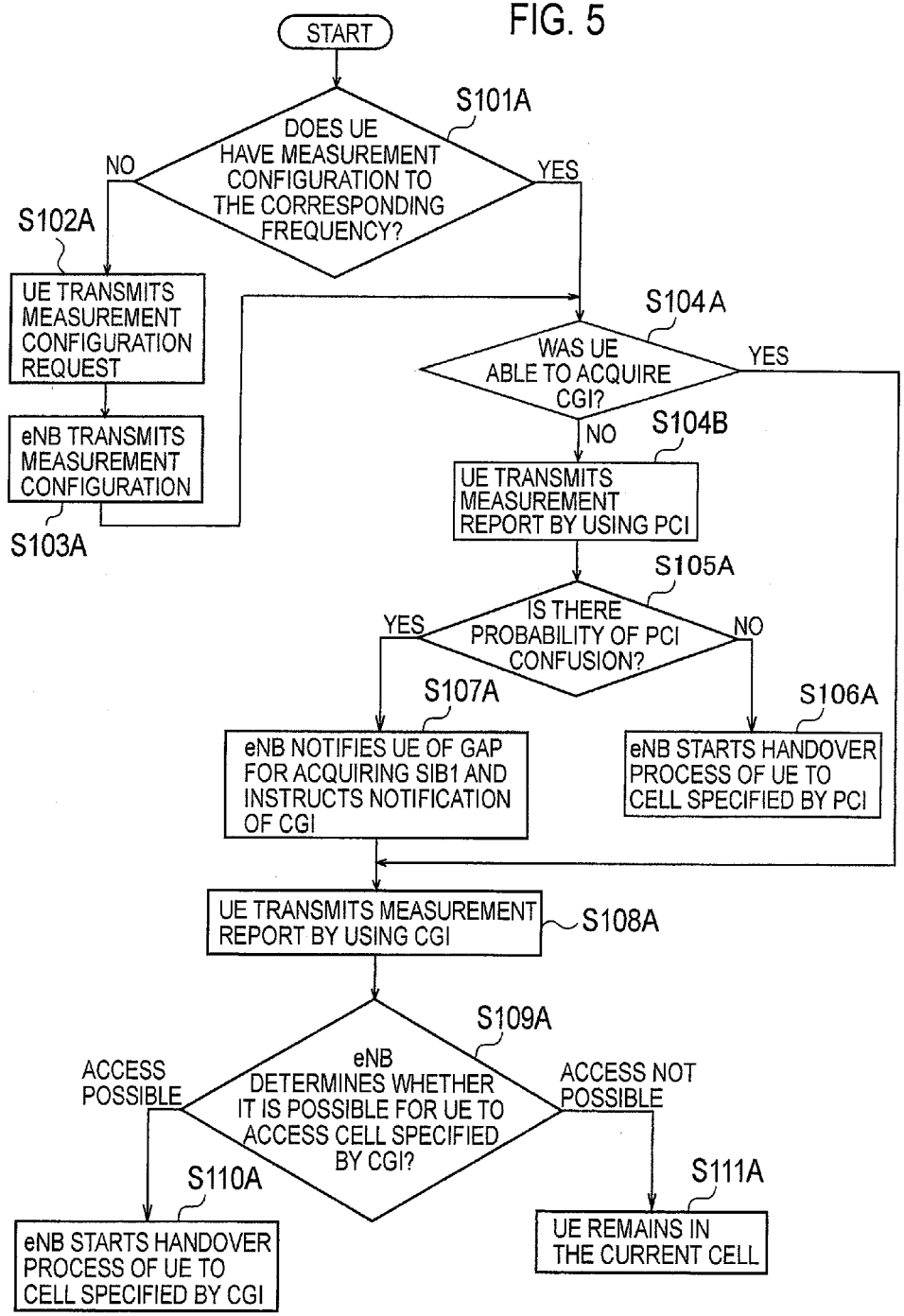

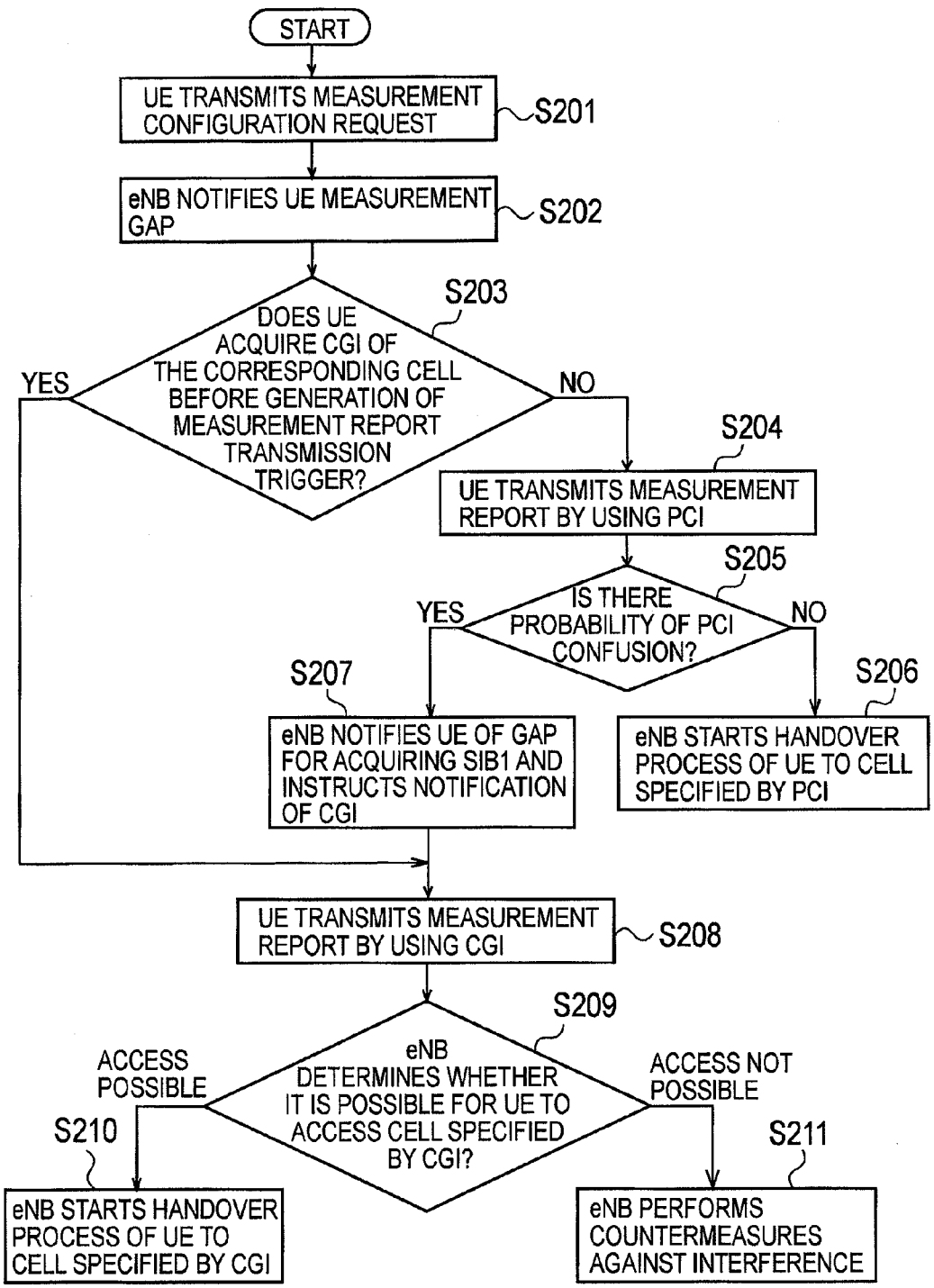

MOBILE COMMUNICATION METHOD, MOBILE STATION, AND RADIO BASE STATION

TECHNICAL FIELD

The present invention relates to a mobile communication method, a mobile station, and a radio base station.

BACKGROUND ART

A mobile communication system specified in 3GPP, for example, a mobile communication system of an LTE (Long Term Evolution) scheme specifies a "CSG cell" wherein only a specific mobile station UE belonging to a "CSG (Closed Subscriber Group)" can be on standby or made accessible.

The CSG cell is assumed to provide an added value to the specific mobile station UE belonging to the CSG in the form of points such as charges, service, and QoS (Quality of Service).

The CSG cell informs a "CSG-ID" and the mobile station UE holds the list of the CSG "Allowed CSG List" having access rights. The mobile station UE receives broadcast information of the cell which is detected by searching the cell and determines whether it can be accessed or stand by in the corresponding cell by determining whether or not the "CSG-ID" included in the broadcast information is included in the "Allowed CSG List".

Furthermore, in the LTE mobile communication system, it is presumed that a mobile station UE being connected measures neighbouring cells, transmits a "Measurement Report" related to the neighbouring cells to a radio base station eNB, and based on the measurement report, the radio base station eNB, to which the mobile station UE is connected, performs handover control by determining the necessity of handover.

However, there is a problem in the mobile communication system where the radio access network fails in the handover because the mobile station UE cannot access the CSG cell though the mobile station which starts the handover process to the corresponding CSG cell on the basis of the "Measurement Report" received from the mobile station UE which does not belong to the CSG of the specific CSG cell and the resources get used unnecessarily as a result.

SUMMARY OF THE INVENTION

Therefore, the present invention is intended to overcome the above-described problem. An object of the present invention is to provide a mobile communication method, a mobile station, and a radio base station by which it is possible to achieve a handover to a CSG cell without using resources unnecessarily.

A first characteristic of the present invention is a mobile communication method, and a gist thereof is to include: a step A in which a mobile station acquires a measurement configuration for a second cell frequency from a radio base station managing a first cell by transmitting a measurement configuration request to the radio base station managing the first cell, when it is determined that it is desired to measure the second cell using a frequency different from a frequency of the first cell in communication and there is no measurement configuration stored for a second cell frequency; a step B in which the mobile station transmits a measurement report including a reception quality in the second cell to the radio base station managing the first cell, in response to the acquired measurement configuration for a second cell frequency; and a step C in which the radio base station managing the first cell starts a handover process of the mobile station to the second cell, when the mobile station is accessible to the second cell and a reception quality in the second cell satisfies a predetermined condition.

A second characteristic of the present invention is a mobile communication method, and a gist thereof is to include: a step A in which a mobile station acquires a measurement configuration for a second cell that is a neighbouring cell using the same frequency as that of a first cell from a radio base station managing the first cell by transmitting a measurement configuration request to the radio base station managing the first cell in communication; a step B in which the mobile station transmits a measurement report including a reception quality in the second cell together with the CGI of the second cell to the radio base station managing the first cell when the reception quality in the second cell satisfies a reporting condition included in the measurement configuration for a second cell and it is successful to acquire the CGI of the second cell by a measurement gap included in the measurement configuration for a second cell; and a step C in which a radio base station managing the first cell starts a handover process of the mobile station to the second cell, when the mobile station is accessible to the second cell and a reception quality in the second cell satisfies a predetermined condition.

A third characteristic of the present invention is a mobile station, and a gist thereof is to include: a measurement configuration acquisition unit configured to acquire a measurement configuration for a second cell frequency from the radio base station managing a first cell by transmitting a measurement configuration request to the radio base station managing the first cell, when it is determined that it is desired to measure the second cell using a frequency different from a frequency of the first cell in communication and there is no measurement configuration stored for a second cell frequency; and a measurement report transmission unit configured to transmit a measurement report including a reception quality in the second cell, to the radio base station managing the first cell, in response to the received measurement configuration for a second cell frequency.

A fourth characteristic of the present invention is a mobile station, and a gist thereof is to include: a measurement configuration acquisition unit configured to acquire a measurement configuration for a second cell that is a neighbouring cell using the same frequency as that of a first cell from a radio base station managing the first cell by transmitting a measurement configuration request to the radio base station managing the first cell in communication; and a measurement report transmission unit configured to transmit a measurement report including a reception quality in the second cell together with the CGI of the second cell to the radio base station managing the first cell when the reception quality in the second cell satisfies a reporting condition included in the measurement configuration for a second cell and it is successful to acquire the CGI of the second cell by a measurement gap included in the measurement configuration for a second cell.

A fifth characteristic of the present invention is a radio base station managing the first cell, and a gist thereof is that a mobile station includes: a measurement configuration transmission unit configured to transmit a measurement configuration for a second cell frequency to a mobile station when a measurement configuration request is transmitted to the radio base station, when it is determined that it is desired to measure the second cell using a frequency different from a frequency of the first cell in communication and does not have the measurement configuration for a second cell frequency; and a handover processing unit configured to start a handover process of the mobile station to the second cell, when the mobile station is accessible to the second cell and a reception quality in the second cell, included in a measurement report received from the mobile station, satisfies a predetermined condition.

A sixth characteristic of the present invention is a radio base station managing the first cell, and a gist thereof is that a radio base station includes: a measurement configuration transmission unit configured to transmit and acquire a measurement configuration for a second cell that is a neighbouring cell using the same frequency as that of the first cell, when a measurement configuration request is transmitted from a mobile station to the radio base station managing the first cell in communication; and a handover processing unit configured to start a handover process of the mobile station to the second cell, when the mobile station is accessible to the second cell and a reception quality in the second cell, included in a measurement report received from the mobile station, satisfies a predetermined condition.

As described above, according to the present invention, it is possible to provide a mobile communication method, a mobile station, and a radio base station by which it is possible to achieve a handover to a CSG cell without using resources unnecessarily.

BRIEF DESCRIPTION OF THE DRAWINGS

FIG. 4 is a flow chart showing the operation of the mobile communication system according to the first embodiment of the present invention.

FIG. 5 is the flow chart showing the operation of the mobile communication system according to the first modification of the present invention.

FIG. 6 is the flow chart showing the operation of the mobile communication system according to the second modification of the present invention.

DETAILED DESCRIPTION (Configuration of Mobile Communication System According to First Embodiment of the Present Invention)

The configuration of the mobile communication system according to the first embodiment of the present invention is explained with reference to FIG. 1 to FIG. 3.

Figure 1:
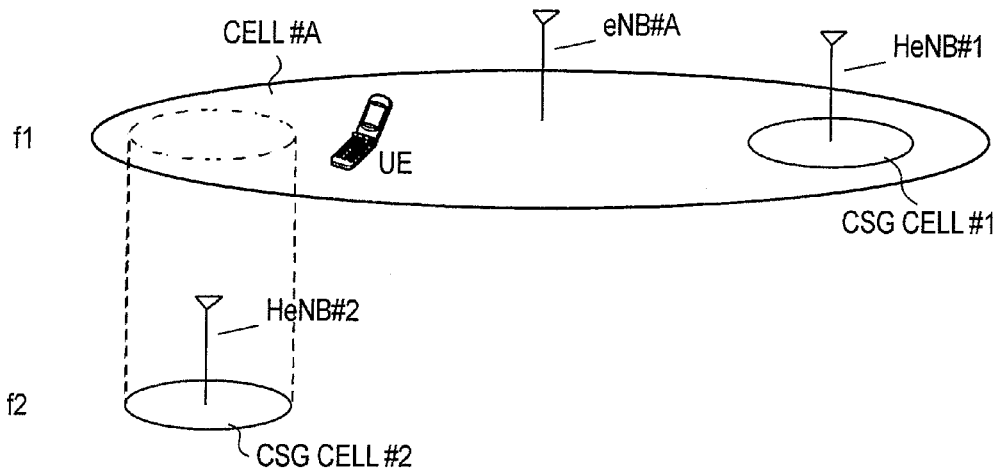
FIG. 1 is an entire configuration diagram of the mobile communication system according to the first embodiment of the present invention.

As shown in FIG. 1, the mobile communication system according to the present embodiment is a mobile communication system of an LTE scheme including, for example, a radio base station eNB#A which manages a cell #A, a radio base station HeNB#1 which manages a CSG cell #1, and a radio base station HeNB#2 which manages a CSG cell #2.

At least one part of a cover area of the CSG cell #1 overlaps with a cover area of the cell #A and a frequency f1 used in the CSG cell #1 is the same as a frequency f1 used in the cell #A.

Further, at least one part of a cover area of the CSG cell #2 overlaps with a cover area of the cell #A and a frequency f2 used in the CSG cell #2 is different from the frequency f1 used in the cell #A.

Here, the cell #A may be a "CSG cell", an "Open cell" or a "Hybrid cell".

An "Open cell" is a cell in which all the mobile stations UEs within the mobile communication system according to the present embodiment can be on standby or accessible.

A "Hybrid cell" is a cell in which the mobile station UE belonging to the CSG is considered as a "CSG cell" and the mobile station UE not belonging to the CSG is considered as an "Open cell". In a "Hybrid cell", it is assumed that an added value is provided to the mobile station UE belonging to the CSG in the form of charges, service, and QoS (Quality of Service).

Further, "CSG-ID (csg-Identity)" is set in the CSG cell in which "csg-Indicator"="TRUE" is set in SIB (System Information Block) 1, which is broadcast information of the CSG cell.

Moreover, "CSG-ID" is set in the Hybrid cell in which "csg-Indicator"="FALSE" is set in the SIB1.

Here, the mobile station UE corresponding to the Release-8 of the 3GPP recognizes that the Hybrid cell is an Open cell.

Moreover, a cell 1 and a cell #2 which are Hybrid cells or Open cells may be used instead of the CSG cell #1 and the CSG cell #2.

Figure 2:
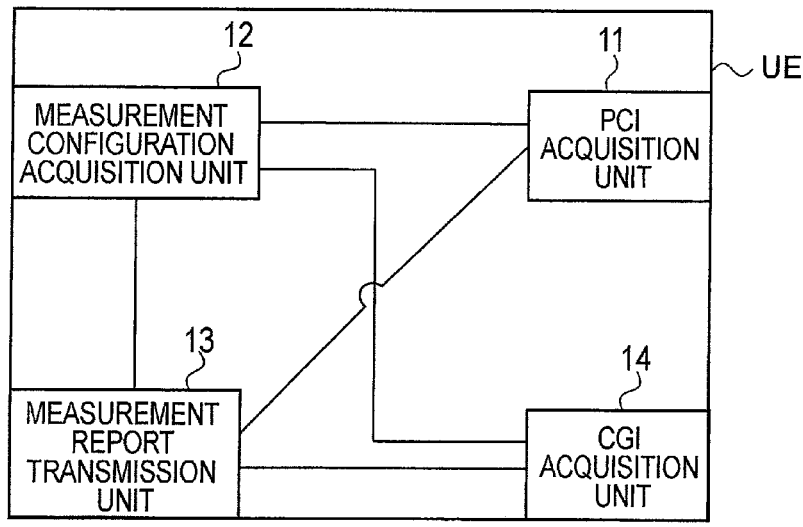
FIG. 2 is a functional block diagram of the mobile station according to the first embodiment of the present invention.

As shown in FIG. 2, the mobile station UE includes a PCI acquiring unit 11, a measurement configuration acquisition unit 12, a measurement report transmission unit 13, and a CGI acquiring unit 14.

The PCI acquisition unit 11 is configured to acquire the PCI (Physical Cell Identity) of the neighbouring cells by searching the cells.

The measurement configuration acquisition unit 12 is configured to acquire the "Measurement Configuration" for each cell.

Here, the "Measurement Configuration" may contain a "Measurement Object", a "Reporting Configuration", and a "Measurement ID" associated with the "Measurement Object" and the "Reporting Configuration", a "Measurement Gap" to measure in the cells with varying frequency and cells with varying RAT (Radio Access Technology), measurement quantity (for example, RSRP or RSRQ) and "Quantity Configuration" specifying the L3 filtering.

The "Measurement Object" contains information such as the frequencies, RAT which are supposed to be measured by the mobile station UE, offset for the specific cell (PCI), and the list of the specific cells which are not targeted for the measurement.

Moreover, the "Reporting Configuration" contains the parameters to specify a moment when the mobile station UE is supposed to send the "Measurement Report" to the radio base station eNB, for example, a threshold value and a report cycle for the event type and the reception quality.

For example, the measurement configuration acquisition unit 12 is configured to acquire the measurement configuration for the frequency f2 of CSG cell #2 from the radio base station eNB#A by sending a "Measurement Configuration Request" to the radio base station eNB#A which manages cell #A when the PCI acquisition unit 11 determines that the mobile station UE desires to measure CSG cell #2 (second cell) using the frequency f2 which is different from the frequency f1 of cell #A (first cell) in communication and when the measurement configuration acquisition unit 12 does not hold the "Measurement Configuration" of the CSG cell #2 for the frequency f2.

The "Measurement Configuration" for the frequency f2 of the CSG cell #2 contains the "Measurement Object", "Reporting Configuration", and "Measurement ID", and "Measurement Gap" related to the frequency f2.

Here, the mobile station UE can determine whether it is desired to measure the CSG cell by determining whether it exists nearby the accessible CSG cell on the basis of the stored peripheral environment (for example, PCI, reception quality and location information, etc.) of the accessible CSG cell.

Alternatively, the mobile station UE, for example, can determine whether the CSG cell needs to be measured on the basis of the stored PLMN or frequency of the accessible CSG cell.

The measurement report transmission unit 13 is configured to send the "Measurement Report" including the reception quality (reception quality corresponding to the measurement quantity) and "PCI" in the cells targeted for the measurement which are included in the measurement configuration according to the measurement configuration acquired by the measurement configuration acquiring unit 12.

For example, the measurement report transmission unit 13 is configured to send the measurement report including the reception quality and "PCI" in the CSG cell #2 to the radio base station eNB#A according to the measurement configuration for the frequency f2 of the CSG cell #2 acquired by the measurement configuration acquiring unit 12.

The CGI acquisition unit 14 is configured to acquire the "CGI (Cell Global Identity)" of each cell included in the SIB1 with the measurement gap included in the measurement configuration. Further, the CGI acquisition unit 14 may simultaneously acquire the "CSG-ID" of each cell included in the SIB1.

Here, though the "CGI" is the identity information which can uniquely specify the cell within the mobile communication system according to the present embodiment; the "PCI (Physical Cell Identity)" is equivalent to a scramble code present in the mobile communication system of WCDMA scheme and it can be used repeatedly in a plurality of cells. In other words, the cells cannot be uniquely specified within the mobile communication system according to the present embodiment only by using the "PCI".

In the mobile communication system according to the present embodiment, 504 different "PCIs" can exist.

Moreover, the mobile station UE can specify the "PCI" if the cell is detected at a cell search step but since the "CGI" and "CSG-ID" are included in the broadcast information, the mobile station UE cannot obtain the "CGI" and "CSG-ID" without receiving the broadcast information. To receive the broadcast information of the neighbouring cell during the communication of the mobile station UE, the "Predetermined gap" to interrupt the communication with the cell in communication for a short period of time (the period enough to receive the broadcast information, for example, 80 ms) is required.

Moreover, the mobile station UE generally needs the "Measurement Gap" to carry out the measurement by searching the cell having a frequency different from the frequency of the cell in communication. The "Measurement Gap" may be less than the predetermined gap necessary to receive the broadcast information but a cyclic measurement gap is necessary to carry out enough averaging of the measurement (For example, measurement gap of 5 ms in 40 ms cycle).

For example, the CGI acquisition unit 14 may be configured to acquire the CGI of the CSG cell #2 by the predetermined gap and the measurement report transmission unit 13 may be configured to send the measurement report including the reception quality in CSG cell #2 by using the CGI of CSG cell #2 when the measurement report transmission unit 13 sends the measurement report including the reception quality in CSG cell #2 by using the PCI of CSG cell #2 and then the measurement configuration acquisition unit 12 receives the predetermined gap from the radio base station eNB#A.

Moreover, the measurement report transmission unit 13 may send the information by including the information indicating whether the mobile station UE belongs to the CSG or the "CSG-ID" of CSG cell #2 in the measurement report at the time of sending this by using the CGI of CSG cell #2.

Here, the predetermined gap is desired to be the gap of a length wherein the SIB1 can be acquired (gap for acquiring the SIB1) and it is considered to be longer than the measurement gap mentioned above.

Figure 3:
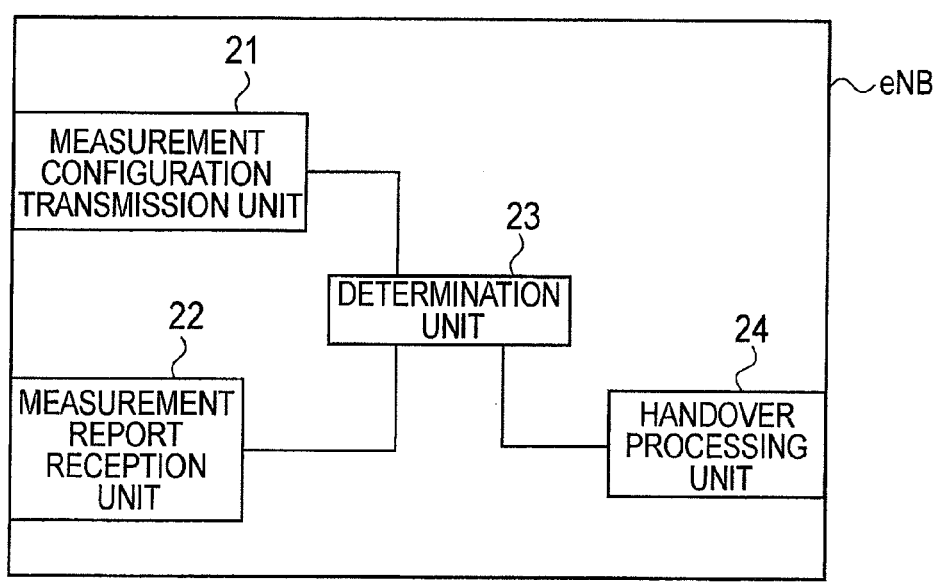
FIG. 3 is the functional block diagram of the radio base station according to the first embodiment of the present invention.

As shown in FIG. 3, the radio base station eNB comprises a measurement configuration transmission unit 21, a measurement report reception unit 22, a determination unit 23 and a handover processing unit 24.

The measurement configuration transmission unit 21 is configured to send the corresponding measurement configuration to the mobile station UE according to the measurement configuration request received from the mobile station UE.

The measurement report reception unit 22 is configured to receive the measurement report sent by the mobile station UE according to the measurement configuration.

The determination unit 23 is configured to determine whether the mobile station UE is accessible to the CSG cell and whether the given conditions for the reception quality in CSG cell #2 included in the measurement report are fulfilled when the measurement report including the reception quality in the CSG cell is received from the mobile station UE.

Moreover, the determination unit 23 is configured to determine whether it is probable that the PCI of the CSG cell included in the measurement report is used in a plurality of neighbouring cells in the cases (probability of occurrence of "PCI Confusion").

For example, when the determination unit 23 manages the PCI by dividing the PCI into the PCI for the CSG cell, PCI for the Hybrid cell, and PCI for the Open cell, and if the PCI of the CSG cell included in the measurement report is not the PCI for the CSG cell, then the determination unit 23 may determine that the PCI of the CSG cell included in the measurement report is probably used in a plurality of neighbouring cells.

Alternatively, when the determination unit 23 manages the PCI by dividing the PCI into the PCI wherein "PCI Confusion" can occur and the PCI wherein "PCI Confusion" cannot occur, and if the PCI of the CSG cell included in the measurement report is the PCI wherein "PCI Confusion" can occur, then the determination unit 23 may determine that the PCI of the CSG cell included in the measurement report is probably used in a plurality of neighbouring cells.

The handover processing unit 24 is configured to carry out the handover process of the relevant mobile station UE according to the result determined by the determination unit 23.

For example, the determination unit 23 may be configured to start the handover process of the mobile station UE to CSG cell #2 when the mobile station UE is accessible to CSG cell #2 and when it is determined that a predetermined condition for the reception quality in CSG cell #2 included in the measurement report received from the mobile station UE is fulfilled.

Moreover, the measurement configuration transmission unit 21 may be configured to instruct so as to notify the CGI of the CSG cell #2 after notifying of the predetermined gap to the mobile station UE when the determination unit 23 determines that the PCI of the CSG #2 included in the measurement report received from the mobile station UE is probably used in a plurality of neighbouring cells.

Note that according to the present embodiment, the determination unit 23 is explained as a part of the function of the radio base station eNB but the determination unit 23 may be located in the other network nodes. For example, the determination unit 23 may be placed in a gateway device (HeNB-GW) or a mobile switching center MME (Mobility Management Entity) present on the upper node.

Moreover, some functions of the determination unit 23, for example, only the functions determining the access rights of the mobile station UE to the CSG cell might as well be placed on the upper node. In this case, the radio base station eNB inquires whether the mobile station UE is accessible to CSG cell #2 with respect to the upper node.

Moreover, the configuration providing the functions determining the access rights on the upper node are useful as the "Allowed CSG List" of the mobile station UE has an advantage in no need to maintain in the radio base station eNB. If the "Allowed CSG List" is maintained in the radio base station eNB, there is a security risk.

(Operation of Mobile Communication System According to First Embodiment of the Present Invention)

The operation of the mobile communication system according to the first embodiment of the present invention is explained with reference to FIG. 4.

As shown in FIG. 4, the mobile station UE determines whether the measurement configuration for the frequency f2 of CSG cell #2 is maintained or not in the step S101, when it is determined that CSG cell #2 using the frequency f2 different from the frequency f1 of cell #A in communication needs to be measured.

When it is determined that the measurement configuration of CSG cell #2 for the frequency f2 is maintained, the operation proceeds to step S104 and when it is determined that the measurement configuration of the CSG cell #2 for the frequency f2 is not maintained, the operation proceeds to step S102.

In step S102, the mobile station UE sends the measurement configuration request regarding the measurement configuration for the frequency f2 of CSG cell #2 to the radio base station eNB#A which manages cell #A. The measurement request may contain information such as the frequency f2 or the radio access technology RAT (LTE, UTRA, GERAN, etc.) which needs to be measured by the mobile station UE.

In step S103, the radio base station eNB#A sends the measurement configuration for the frequency f2 of CSG cell #2 to the mobile station UE. The measurement configuration may contain information such as a "Measurement Object (RAT or frequency)", a "Reporting Configuration", a "Measurement ID" which links the "Measurement Object" and the "Reporting Configuration", and a "Measurement gap". Moreover, the radio base station eNB#A may send the measurement configuration so that only the measurement configuration entity which is not set for the mobile station UE is newly set.

In the step S104, the mobile station UE sends the measurement report including the reception quality in the CSG cell #2 to the radio base station eNB#A by using the PCI of the CSG cell #2 obtained (detected) by searching the cell.

In step S105, the radio base station eNB#A determines whether or not it is probable that the PCI of CSG cell #2 pertaining to the measurement report received is used in a plurality of neighbouring cells, i.e., whether or not it is probable that "PCI Confusion" related to the PCI of CSG cell #2 pertaining to the measurement report received occurs.

When it is determined that there is no probability of an occurrence of "PCI Confusion", the operation proceeds to step S106 and when it is determined that there is a probability of an occurrence of "PCI Confusion", the operation proceeds to step S107.

In step S106, the radio base station eNB#A starts the handover process of the mobile station UE to the cell (CSG cell #2) specified by the PCI.

In step S107, the radio base station eNB#A instructs so as to notify the CGI of CSG cell #2 after notifying of the predetermined gap (the gap for acquiring the SIB1) to the mobile station UE.

In step S108, the mobile station UE acquires the CGI of CSG cell #2 by the predetermined gap and sends the measurement report including the reception quality in CSG cell #2 to the radio base station eNB#A by using the CGI of the CSG cell #2.

In the step S109, the radio base station eNB#A determines the access possibility of the mobile station UE to the cell (CSG cell #2) specified by the CGI of CSG cell #2 pertaining to the measurement report received.

Further, the determination may be carried out on the upper node. In such a case, radio base station eNB#A inquires about the accessibility of the mobile station UE to the cell (CSG cell #2) specified by the CGI of CSG cell #2 to the upper node.

If it is determined to be accessible, the radio base station eNB#A starts the handover process of the mobile station UE to the cell (CSG cell #2) specified by the CGI in step S110.

On the other hand, if it is determined to be inaccessible, the radio base station eNB#A does not start the handover process of the mobile station UE to the cell (CSG cell #2) specified by the CGI and the mobile station UE continues communicating with cell #A in communication in the step S111.

(Operation and Effect of Mobile Communication System According to First Embodiment of the Present Invention)

According to the mobile communication system pertaining to the first embodiment of the present invention, the handover process of the mobile station UE to the CSG cell starts only when the mobile station UE is accessible to the CSG cell. Therefore, it is possible to avoid wasting resources and carry out the handover to the CSG cell.

(First Modification)

The first modification of the mobile communication system according to the first embodiment of the present invention is explained with reference to FIG. 5. The mobile communication system according to the present first modification is explained below by focusing on the differences with the mobile communication system according to the first embodiment of the present invention mentioned above.

In the mobile communication system according to first modification, the measurement report transmission unit 13 may be configured to send the measurement report including the reception quality in CSG cell #2 by using the CGI of CSG cell #2 and not by using the PCI of CSG cell #2 when the CGI acquisition unit 14 of the mobile station UE has acquired the CGI of CSG cell #2 with the measurement gap included in the measurement configuration of CSG cell #2 for the frequency f2.

The operation of the mobile communication system according to the first modification is explained below with reference to FIG. 5.

As shown in FIG. 5, step S101A to step S103A have an operation similar to the operation of step S101 to step S103 shown in FIG. 4.

In step S104A, the mobile station UE determines whether the CGI of CSG cell #2 has been obtained with the measurement gap mentioned above.

When the CGI of CSG cell #2 has been obtained, the operation proceeds to step S108A and when the CGI of CSG cell #2 has not been obtained, the operation proceeds to step S104B.

The operation of step S104B to step S111A below is similar to the operation of step S104 to step S111 shown in FIG. 4.

(Second Modification)

Second modification of the mobile communication system according to the first embodiment of the present invention is explained with reference to FIG. 6. The mobile communication system according to the present second modification is explained below by focusing on the differences from the mobile communication system according to the first embodiment of the present invention mentioned above.

The mobile communication system according to the present second modification has the measurement configuration acquisition unit 12 configured to acquire the measurement configuration (specifically, the measurement gap) for CSG cell #1 (second cell) which is the neighbouring cell using the frequency f1 which is the same as the frequency as cell #A (first cell) from the radio base station eNB#A by sending the measurement configuration request to the radio base station eNB#A at a predetermined timing.

For example, the measurement configuration acquisition unit 12 is configured to acquire the measurement configuration (specifically, the measurement gap) for CSG cell #1 (second cell) before the generation of a measurement report transmission trigger pertaining to CSG cell #1, i.e., before fulfilling the reporting configuration which includes reception quality in CSG cell #1 in the measurement configuration for the CSG cell #1.

The operation of the mobile communication system according to the second modification is explained below with reference to FIG. 6.

As shown in FIG. 6, cell #A and the mobile station UE in communication send the measurement configuration request related to CSG cell #1 to the radio base station eNB#A at a predetermined timing in step S201 and the radio base station eNB#A sends the measurement gap for CSG cell #1 to the mobile station UE according to the measurement configuration request related to the CSG cell #1 as the measurement configuration for CSG cell #1 in step S202.

In step S203, the mobile station UE determines whether the CGI of the CSG cell #1 is acquired with the measurement gap set for the CSG cell #1 before fulfilling the reporting configuration which includes the reception quality in CSG cell #1 in the measurement configuration for CSG cell #1.

When it is determined that the CGI of CSG cell #1 is acquired, the operation proceeds to step S208 and when it is determined that the CGI of CSG cell #1 is not acquired, the operation proceeds to step S204.

The operation of step S204 to step S210 below is similar to the operation of step S104 to step S110 shown in FIG. 4 excluding the differences between CSG cell #1 and CSG cell #2.

In step S211, the radio base station eNB#A performs the countermeasures against the interference in view of the fact that the communication between the mobile station UE and the cell #A may probably cause interference in CSG cell #1.

For example, the handover processing unit 24 of the radio base station eNB#A may perform the redirection process or the handover process of the mobile station UE to the cell with a different frequency or RAT.

Thus, in the present embodiment, the present invention is described by using the mobile communication system of the LTE scheme as an example; however, the present invention may be applied to another mobile communication system, for example, a mobile communication system of the WCDMA scheme.

For example, in the mobile communication system of the WCDMA scheme, at least some functions of the radio base station eNB may be configured to be provided in the radio line control station RNC.

Characteristics of the present embodiment described above may be expressed as follows.

A first characteristic of the present invention is a mobile communication method, and a gist thereof is to include: a step A in which a mobile station UE acquires a measurement configuration for a frequency f2 of a CSG cell#2 from a radio base station eNB#A by transmitting "Measurement Configuration Request" to the radio base station eNB#A managing a cell #A, when it is determined that it is desired to measure the CSG cell #2 (second cell) using a frequency f2 different from a frequency f1 of the cell #A (first cell) in communication and there is not held the "Measurement Configuration" for the frequency f2 of the CSG cell #2; a step B in which the mobile station UE transmits "Measurement Report" including a reception quality (RSRP, RSRQ, etc.) in the CSG cell #2 to the radio base station eNB#A, in response to the acquired measurement configuration for the frequency f2 of the CSG cell #2; and a step C in which the radio base station eNB#A starts a handover process of the mobile station UE to the CSG cell #2, when the mobile station UE is accessible to the CSG cell #2 and a reception quality in the CSG cell #2 satisfies a predetermined condition.

In the first characteristic of this embodiment, the frequency of the second cell and information of RAT may be included in the measurement configuration request in the step A.

In the first characteristic of this embodiment, the step B may include: a step of transmitting the measurement report including the reception quality in the CSG cell #2 by using PCI of the CSG cell #2; a step of notifying the mobile station UE of a predetermined gap, when the radio base station eNB#A determines that the PCI of the CSG cell #2 included in the measurement report is probably used in a plurality of neighbouring cells; and a step in which the mobile station UE transmits the measurement report including the reception quality in the CSG cell #2 by using the CGI of the CSG cell #2 acquired by the predetermined gap.

In the first characteristic of this embodiment, in the step C, the mobile station UE may transmit the measurement report including the reception quality in the CSG cell #2 by using the CGI of the CSG cell #2, when the CGI of the CSG cell #2 can be acquired by a measurement gap included in the measurement configuration for the frequency f2 of the CSG cell #2.

A second characteristic of the present invention is a mobile communication method, and a gist thereof that a mobile station UE includes: a step A of acquiring a measurement configuration for a CSG cell #2 (second cell) that is a neighbouring cell using the same frequency f1 as that of a cell #A (first cell) from a radio base station eNB#A, by transmitting a measurement configuration request to the radio base station eNB#A; a step B in which the mobile station UE transmits a measurement report including a reception quality in the CSG cell #1 by using the CGI of the CSG cell #1 to the radio base station eNB#A, when the reception quality in the CSG cell #1 satisfies a report configuration included in the measurement configuration for the CSG cell #1 and it is successful to acquire the CGI of the CSG cell #1 by a measurement gap included in the measurement configuration for the CSG cell #1; and a step C in which the radio base station eNB#A starts a handover process of the mobile station UE to the CSG cell

1, when the mobile station UE is accessible to the CSG cell #1 and the reception quality in the CSG cell #1 satisfies a predetermined condition.

In the second characteristic of this embodiment, the step B may include: a step in which the mobile station UE transmits the measurement report including the reception quality in the CSG cell #1 by using the PCI of the CSG cell #1 to the radio base station eNB#A, when the reception quality in the CSG cell #1 satisfies the report configuration and it is failed to acquire the CGI of the CSG cell #1 by the above-described measurement gap; a step in which the radio base station eNB#A notifies the mobile station UE of a predetermined gap, when it is determined that the PCI of the CSG cell #1 included in the received measurement report is probably used in a plurality of neighbouring cells; and a step in which the mobile station UE transmits the measurement report including the reception quality in the CSG cell #1 by using the CGI of the CSG cell #1 acquired by the predetermined gap.

A third characteristic of this embodiment is a mobile station, and a gist thereof is to include: a measurement configuration acquisition unit 12 configured to acquire a measurement configuration for a frequency f2 of a CSG cell #2 from a radio base station eNB#A, by transmitting a measurement configuration request to the radio base station eNB#A, when it is determined that it is determined to desire to measure a CSG cell #2 (second cell) using a frequency f2 different from a frequency f1 of the cell #A (first cell) in communication and there is not held the measurement configuration for the frequency f2 of the CSG cell #2; and a measurement report transmission unit 13 configured to transmit a measurement report including a reception quality in the CSG cell #2 to the radio base station eNB#A, in response to the received measurement configuration for the frequency f2 of the CSG cell #2.

In the third characteristic of this embodiment, it may be so configured that a CGI acquisition unit 14 configured to acquire CGI of each cell is provided and when the measurement configuration acquisition unit 12 receives the predetermined gap from the radio base station eNB#A after the measurement report transmission unit 13 transmits the measurement report including the reception quality in the CSG cell #2 by using the PCI of the CSG cell #2, the CGI acquisition unit 14 acquires CGI of the CSG cell #2 by a predetermined gap and the measurement report transmission unit 13 transmits the measurement report including the reception quality in the CSG cell #2 by using the CGI of the CSG cell #2.

In the third characteristic of this embodiment, it may be so configured that a CGI acquisition unit 14 configured to acquire CGI of each cell is provided and when the CGI acquisition unit 14 can acquire the CGI of the CSG cell #2 by the measurement gap included in the measurement configuration for the frequency f2 of the CSG cell #2, the measurement report transmission unit 13 transmits the measurement report including the reception quality in the CSG cell #2 by using the CGI of the CSG cell #2.

A fourth characteristic of this embodiment is a mobile station UE, and a gist thereof is to include: a measurement configuration acquisition unit 12 configured to acquire a measurement configuration for a CSG cell #1 (second cell) that is a neighbouring cell using the same frequency f1 as that of a cell #A (first cell) from a radio base station eNB#A, by transmitting a measurement configuration request to the radio base station eNB#A; a measurement report transmission unit 13 configured to transmit a measurement report including the reception quality in the CSG cell #1 by using the CGI of the CSG cell #1 to the radio base station eNB#A, when the reception quality in the CSG cell #1 satisfies a report configuration included in the measurement configuration for the CSG cell #1 and it is successful to acquire the CGI of the CSG cell #1 by a measurement gap included in the measurement configuration for the CSG cell #1.

In the fourth characteristic of this embodiment, the frequency of the second cell and information of RAT may be included in the measurement configuration request.

In the fourth characteristic of this embodiment, it may be so configured that a CGI acquisition unit 14 configured to acquire CGI of each cell is provided and the measurement report transmission unit 13 transmits the measurement report including the reception quality in the CSG cell #1 by using the PCI of the CSG cell #1 to the radio base station eNB#A, when the reception quality in the CSG cell #1 satisfies the report configuration and it is failed to acquire the CGI of the CSG cell #1 by the above-described measurement gap, and when the measurement configuration acquisition unit 12 receives the predetermined gap from the radio base station eNB#A, the CGI acquisition unit 14 acquires CGI of the CSG cell #1 by the predetermined gap and the measurement report transmission unit 13 transmits the measurement report including the reception quality in the CSG cell #1 by using the CGI of the CSG cell #1.

A fifth characteristic of this embodiment is a radio base station eNB#A managing a cell #A (first cell), and a gist thereof is that a mobile station UE includes: a measurement configuration transmission unit 21 configured to transmit a measurement configuration for a frequency f2 of a CSG cell #2 to the mobile station UE upon transmitting a measurement configuration request to the radio base station eNB#A, when it is determined that it is determined to desire to measure the CSG cell #2 (second cell) using the frequency f2 different from the frequency f1 of the cell #A in communication and there is not held the measurement configuration for the frequency f2 of the CSG cell #2; and a handover processing unit 24 configured to start a handover process of the mobile station UE to the CSG cell #2, when the mobile station UE is accessible to the CSG cell #2 and the reception quality in the CSG cell #2 included in the measurement report received from the mobile station UE satisfies a predetermined condition.

In the fifth characteristic of this embodiment, the measurement configuration transmission unit 21 may be configured to generate a measurement configuration to be transmitted, based on the frequency included in the measurement configuration request and information of RAT.

In the fifth characteristic of this embodiment, the measurement configuration transmission unit 21 may be configured to notify the mobile station UE of a predetermined gap and to instruct a notification of the CGI of the CSG cell #2, when it is determined that the PCI of the CSG cell #2 included in the measurement report received from the mobile station UE is probably used in a plurality of neighbouring cells.

A sixth characteristic of this embodiment is a radio base station eNB#A managing a cell #A (first cell), and a gist thereof is that a mobile station UE includes: a measurement configuration transmission unit 21 configured to transmit and acquire a measurement configuration for a CSG cell #1 (second cell #A) that is a neighbouring cell using the same frequency f1 as that of the cell #A, upon transmitting the measurement configuration request to the radio base station eNB#A managing the cell #A in communication; and a handover processing unit 24 configured to start a handover process of the mobile station UE to the CSG cell #1, when the mobile station UE is accessible to the CSG cell #1 and the reception quality in the CSG cell #1 included in the measurement report received from the mobile station UE satisfies a predetermined condition.

In the sixth characteristic of this embodiment, the measurement configuration transmission unit 21 may be configured to notify the mobile station UE of a predetermined gap and to instruct a notification of the CGI of the CSG cell #1, when it is determined that the PCI of the CSG cell #1 included in the measurement report received from the mobile station UE is probably used in a plurality of neighbouring cells.

It is noted that the operation of the above-described the mobile station UE or the radio base station eNB/HeNB may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the mobile station UE or the radio base station eNB/HeNB. Further, such a storage medium or a processor may be arranged, as a discrete component, in the mobile station UE or the radio base station eNB/HeNB.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication method in a mobile communication system including a Closed Subscriber Group (CSG) cell to which only a mobile station having an access right to the CSG cell can access, comprising performing the following steps in sequence:
   (A) transmitting, from the mobile station to a radio base station in communication, a predetermined signal including a frequency of a CSG cell and information of Radio Access Technology (RAT), when the mobile station determines that the mobile station exists nearby the CSG cell, the mobile station having an access right to the CSG cell;
   (B) transmitting, from the radio base station to the mobile station, a measurement configuration for the frequency of the CSG cell;
   (C) measuring, at the mobile station, the frequency of the CSG cell in response to the measurement configuration for the frequency of the CSG cell; and transmitting, from the mobile station to the radio base station, a measurement report including a Physical Cell Identity (PCI) and a reception quality in the CSG cell;
   (D) transmitting, from the radio base station to the mobile station, an instruction signal for instructing to notify a Cell Global Identity (CGI) of a cell specified by the PCI included in the measurement report;
   (E) receiving, at the mobile station, broadcast information of the cell specified by the PCI in response to the instruction signal; and transmitting, from the mobile station to the radio base station, a response signal including a CGI and a Closed Subscriber Group Identification (CSG-ID) included in the broadcast information and information indicating whether or not the mobile station belongs to the CSG;
   (F) starting, at the radio base station, a handover process of the mobile station to the CSG cell; and
   (G) determining, at an upper node of the radio base station, whether the mobile station has an access right to the CSG cell or not.

2. A mobile station used in a mobile communication system including a Closed Subscriber Group (CSG) cell to which only the mobile station having an access right to the CSG cell can access, comprising:
   a measurement configuration acquisition unit configured to transmit a predetermined signal including a frequency of a CSG cell and information of Radio Access Technology (RAT) to a radio base station in communication when the mobile station determines that the mobile station exists nearby the CSG cell, and to acquire a measurement configuration for the frequency of the CSG cell from the radio base station, the mobile station having an access right to the CSG cell; and
   a measurement report transmission unit configured to measure the frequency of the CSG cell in response to the measurement configuration received from the radio base station, and to transmit a measurement report including a Physical Cell Identity (PCI) and a reception quality in the CSG cell to the radio base station,
   wherein the following steps are performed in sequence:
   (A) transmitting, from the mobile station to the radio base station in communication, the predetermined signal including the frequency of the CSG cell and information of RAT, when the mobile station determines that the mobile station exists nearby the CSG cell, the mobile station having the access right to the CSG cell;
   (B) transmitting, from the radio base station to the mobile station, the measurement configuration for the frequency of the CSG cell;
   (C) measuring, at the mobile station, the frequency of the CSG cell in response to the measurement configuration for the frequency of the CSG cell; and transmitting, from the mobile station to the radio base station, the measurement report including a PCI and the reception quality in the CSG cell;
   (D) transmitting, from the radio base station to the mobile station, an instruction signal for instructing to notify a Cell Global Identity (CGI) of the cell specified by the PCI included in the measurement report;
   (E) receiving, at the mobile station, broadcast information of the cell specified by the PCI in response to the instruction signal; and transmitting, from the mobile station to the radio base station, a response signal including a CGI and a Closed Subscriber. Group Identification (CSG-ID) included in the broadcast information and information indicating whether or not the mobile station belongs to the CSG;
   (F) starting, at the radio base station, a handover process of the mobile station to the CSG cell; and
   (G) determining, at an upper node of the radio base station, whether the mobile station has the access right to the CSG cell or not.

3. A radio base station used in a mobile communication system including a Closed Subscriber Group (CSG) cell to which only a mobile station having an access right to the CSG cell can access, comprising:

a measurement configuration transmission unit configured to transmit a measurement configuration for a frequency of a CSG cell, when receiving a predetermined signal including the frequency of the CSG cell and information of Radio Access Technology (RAT) from a radio base station when the mobile station determines that the mobile station exists nearby the CSG cell; and a handover processing unit configured to transmit, to the mobile station, an instruction signal for instructing to notify a Cell Global Identity (CGI) of a cell specified by a Physical Cell Identity (PCI) included in a measurement report, when receiving the measurement report including the PCI and a reception quality in the CSG cell from the mobile station, wherein the following steps are performed in sequence:

(A) transmitting, from the mobile station to the radio base station in communication, the predetermined signal including the frequency of the CSG cell and information of RAT, when the mobile station determines that the mobile station exists nearby the CSG cell, the mobile station having the access right to the CSG cell;

(B) transmitting, from the radio base station to the mobile station, the measurement configuration for the frequency of the CSG cell;

(C) measuring, at the mobile station, the frequency of the CSG cell in response to the measurement configuration for the frequency of the CSG cell; and transmitting, from the mobile station to the radio base station, the measurement report including the PCI and the reception quality in the CSG cell;

(D) transmitting, from the radio base station to the mobile station, the instruction signal for instructing to notify the CGI of the cell specified by the PCI included in the measurement report;

(E) receiving, at the mobile station, broadcast information of the cell specified by the PCI in response to the instruction signal; and transmitting, from the mobile station to the radio base station, a response signal including the CGI and a Closed Subscriber Group Identification (CSG-ID) included in the broadcast information and information indicating whether or not the mobile station belongs to the CSG;

(F) starting, at the radio base station, a handover process of the mobile station to the CSG cell; and (G) determining, at an upper node of the radio base station, whether the mobile station has the access right to the CSG cell or not.

* * * * *